United States Patent [19]

Balderson

[11] Patent Number: 4,983,810
[45] Date of Patent: Jan. 8, 1991

[54] HEATING UNIT WITH THERMOCHROMIC REGION

[75] Inventor: Simon N. Balderson, Reading, England

[73] Assignee: Thorn EMI plc, London, England

[21] Appl. No.: 179,873

[22] Filed: Apr. 11, 1988

[30] Foreign Application Priority Data

Apr. 15, 1987 [GB] United Kingdom ............. 8709051

[51] Int. Cl.$^5$ ............................................. H05B 3/68
[52] U.S. Cl. .................................. 219/462; 338/214; 219/544; 219/530
[58] Field of Search ............. 338/214; 219/462, 461, 219/464, 530, 544

[56] References Cited

U.S. PATENT DOCUMENTS 3,352,794 11/1967 Abdo .
3,781,522 12/1973 Borom et al. .
3,781,523 12/1973 Borom .

FOREIGN PATENT DOCUMENTS 2429563 9/1975 Fed. Rep. of Germany .
2853987 7/1980 Fed. Rep. of Germany .
2331231 6/1977 France .
1205652 9/1970 United Kingdom .

OTHER PUBLICATIONS

"Thermochromism of Inorganic Compounds", by J. H. Day, Chem. Rev. vol. 68, No. 6, Nov. 25, 1968, pp. 669–657.

Primary Examiner—Bruce A. Reynolds
Assistant Examiner—Marvin M. Lateef
Attorney, Agent, or Firm—Fleit, Jacobson, Cohn, Price, Holman & Stern

[57] ABSTRACT

A heating unit includes a heatable surface. At least a region of the heatable surface is coated or otherwise provided with a layer incorporating a thermochromic material in sufficient quantity to influence the perceived color of the layer. The thermochromic material exhibits an absorption edge wavelength which changes reversibly with temperature in the range of from 20° C. to at least 400° C. The absorption edge wavelength is at least 540 nm at 20° C. and progressively increases to at most 700 nm at 400° C. Such a heating unit is able to provide a visual indication of whether or not the heatable surface is still hot once the power has been switched off. Useful thermochromic materials include $Cd(S_{1-x}Se_x)$ and $(Zn_{1-y}Mn_y)O$.

8 Claims, 3 Drawing Sheets

HEATING UNIT WITH THERMOCHROMIC REGION

This invention relates to heating units having thermochromic surface coatings as temperature indicators.

The use of thermochromic materials to indicate a particular temperature by a discontinuous reversible colour change is well-known. There are also certain materials, particularly those containing trivalent chromium ions, which change colour continuously and reversibly with temperature.

The article "Thermochromism of Inorganic Compounds" (J. H. Day, Chem. Rev. Vol. 68, No. 6, Nov. 25, 1968, Pp. 669–657) describes many inorganic compounds showing thermochromic behaviour.

U.S. Pat. No. 3,781,522 discloses a heating plate with the upper surface covered with a thermochromic surface coating which includes 1–10% by weight basic lead chromate (PbO. PbCrO$_4$) as the thermochromic consituent. This is said to produce the following colour changes:

| Temperature | 20° C. | 194° C. | 284° C. | 373° C. | 450° C. | 532° C. |
|---|---|---|---|---|---|---|
| Colour | Pale Yellow | Mustard Yellow | Yellow Orange | Reddish Yellow | Reddish Orange | Reddish Brown |

U.S. Pat. No. 3,781,523 discloses a similar heating plate arrangement except that the thermochromic constituent comprises by weight 0.5–2% cadmium sulphide (CdS), 0.5–2% selenium (Se) and 0–7% zinc oxide (ZnO), giving rise to the following colour changes:

| Temperature | 20° C. | 130° C. | 230° C. | 450° C. |
|---|---|---|---|---|
| Colour | bright yellow | mustard yellow | bright orange | red-orange |

It is desirable to have more distinct colour changes than those shown by the above materials, especially over the temperature range 20°–200° C. One example of a material meeting this requirement, disclosed in U.S. Pat. No. 3,352,794 is XAgI$_2$·HgI$_2$. Preferably X lies between 5.9 and 6.5, giving the following reversible continuous colour changes:

| Temperature | 26° C. | 46° C. | 121° C. | 149° C. | 218° C. |
|---|---|---|---|---|---|
| Colour | Yellow | Orange | Red | Maroon | Purple-Black |

However, at a temperature somewhat above 246° C. this material decomposes and the colour is no longer reversible when heated. For many applications this temperature limit is too low.

One object of this invention is to provide a heating unit with a coating or layer of thermochromic material which exhibits a progressive colour change to black or dark maroon from yellow, orange or red over the temperature range 20° C. to 400° C.

Another object is to provide a range of thermochromic surface coatings, so that composition can be chosen to provide the more readily perceivable colour changes (orange to red to maroon) within a selected temperature range.

A further object is to provide a coating with a temperature stable colour for comparison purposes.

In accordance with the present invention, there is provided a heating unit comprising a heatable surface having at least a region of the heatable surface coated or otherwise provided with a layer incorporating a thermochromic material in sufficient quantity to influence the perceived colour of the layer, the thermochromic material exhibiting an absorption edge wavelength which changes reversibly with temperature in the range of from 20° C. to at least 400° C., the absorption edge wavelength being at least 540 nm at 20° C. which wavelength progressively increases to at most 700 nm at 400° C.

Preferably the absorption edge wavelength at 20° C. is in the range of from 540 nm to 610 nm, which absorption edge wavelength progressively increases to a wavelength at 400° C. in the range of from 660 nm to 700 nm.

Such heating units are able to provide a visual indication of whether or not the heatable surface is still hot once the power has been switched off.

Preferably the absorption edge wavelength of the thermochromic material at 400° C. is at least 90 nm greater than the absorption edge wavelength of said thermochromic material at 20° C. In this way, a marked change in colour of the thermochromic material may be observed between room temperature and the operating temperature of the heating unit.

The thermochromic material may comprise a compound having the formula Cd(S$_{1-x}$Se$_x$) with x in the range of from e.g. 0 to 0.05 or a compound having the formula (Zn$_{1-y}$Mn$_y$)O with y in the range of from e.g. 0.05 to 0.15.

In one embodiment, the heatable surface comprises a glass or glass ceramic surface and the thermochromic layer comprises a glass or glass ceramic composition having a low expansion co-efficient, for example comprising lithium or magnesium aluminium silicates.

In another embodiment, the surface is metal and the thermochromic layer comprises a glass or glass ceramic composition having an expansion co-efficient matching that of the metal surface.

Embodiments of the invention will now be described, by way of example only, with reference to the accompanying drawings in which:

FIG. 1b shows an absorption spectrum for the semiconductor material of FIG. 1a;

Figure 2A:
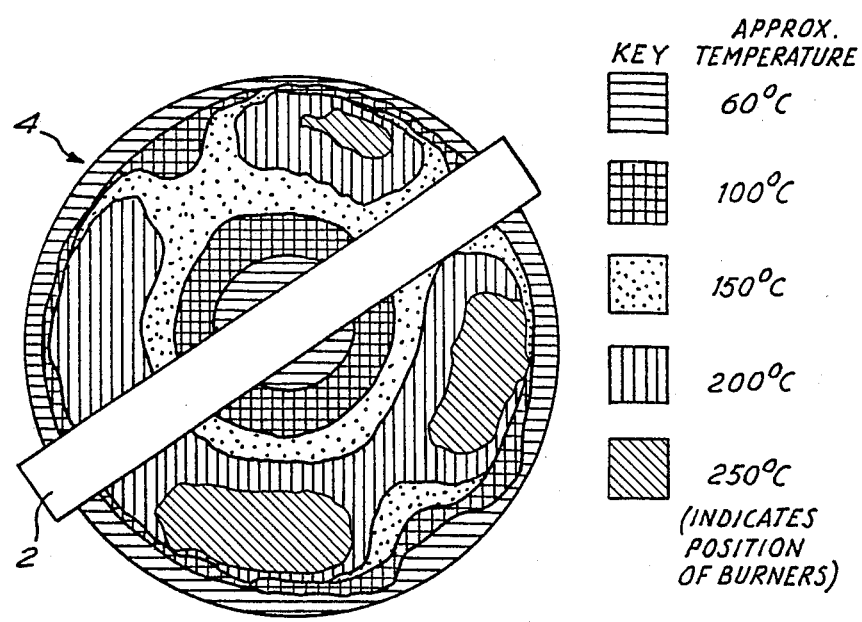
FIG. 2a shows a heated hotplate with a strip of thermochromic material.
Figure 2B:
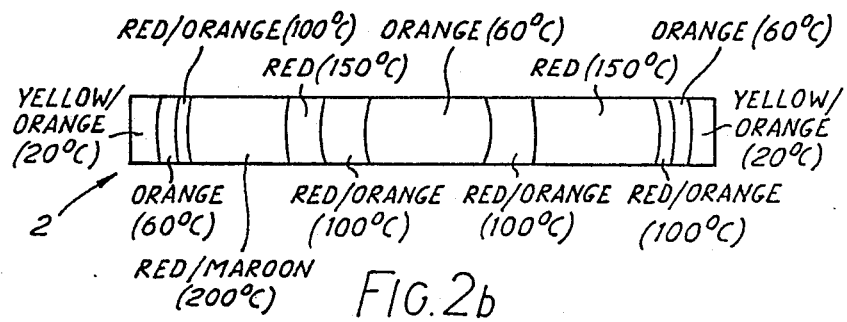
Figure 3:
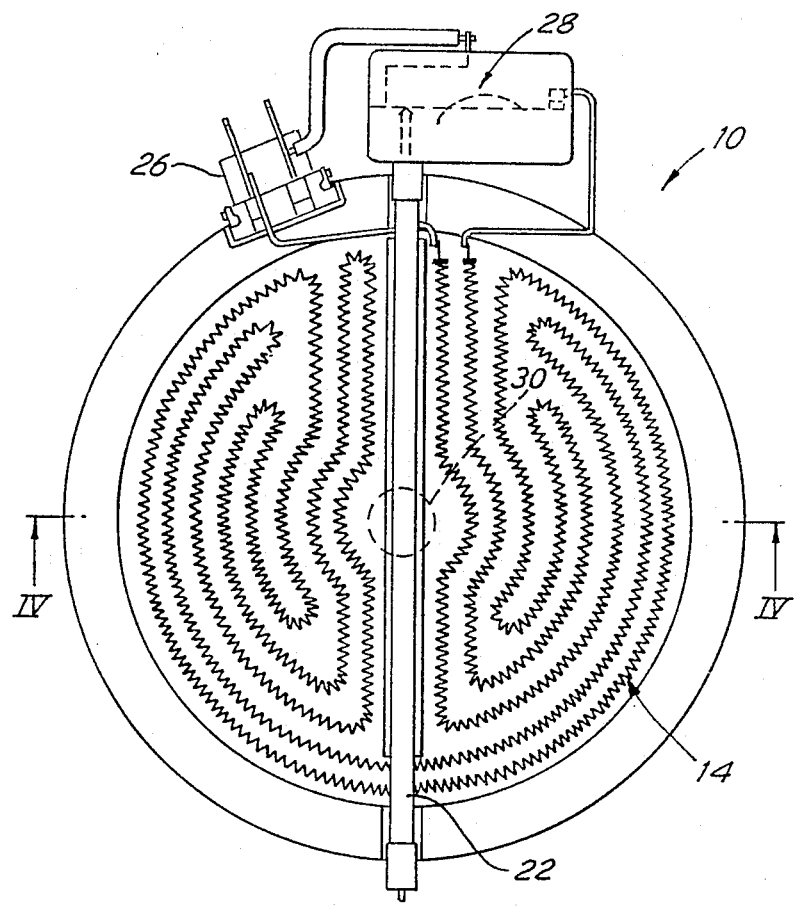
Figure 4:
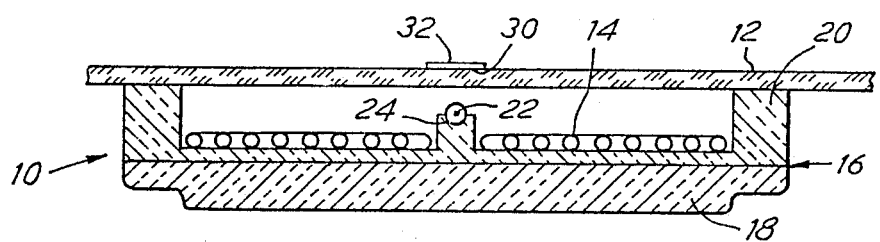

FIG. 2b indicates the colour of the thermochromic strip of FIG. 2a;

FIG. 3 shows a plan view of a heating unit provided in accordance with the present invention;

FIG. 4 is a section along the line IV—IV of FIG. 3.

As shown in Table 1, the inventor has discovered a number of compositions which give a useful colour sequence of orange to red to maroon to black within a wide temperature range including the temperature range of from 20° C. to 200° C. These compositions are stable in the temperature range of from 20° C. to 400° C. and accordingly the colour change is reversible with change in temperature in the temperature range of interest.

TABLE 1

| Thermochromic Material | Approximate wavelength of absorption edge (nm) and colour at: | | | |
|---|---|---|---|---|
| | 20° C. | 100° C. | 200° C. | 400° C. |
| CdS | 540 Yellow/Orange | 590 Orange/Red | 630 Red/Maroon | 660 Dark Maroon |
| Cd ($S_{0.95}$ $Se_{0.05}$) | 570 Orange | 620 Red | 660 Dark Maroon | 700 Black |
| ($Zn_{0.95}$ $Mn_{0.05}$) O | 570 Orange | 610 Red | 640 Maroon | 670 Dark Maroon |
| ($Zn_{0.85}$ $Mn_{0.15}$) O | 610 Red | 640 Maroon | 660 Dark Maroon | 700 Black |

For the Cd (S,Se) system, it has been found that increasing the selenium content increases the wavelength of the absorption edge at a given temperature and accordingly reduces the temperature for a given colour as shown in Table 1. The inventor has also discovered that increasing the manganese content in the (Zn, Mn) O system increases the absorption edge at a given temperature and reduces the temperature for a given colour as shown in Table 1.

Figure 1A:
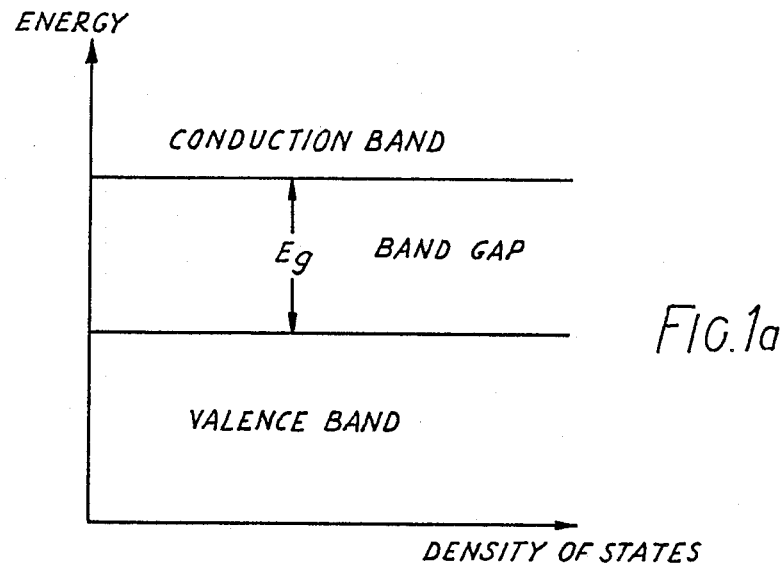
FIG. 1a shows a standard energy v density of states diagram for a semiconductor material which may be used as a thermochromic material.
Figure 1B:
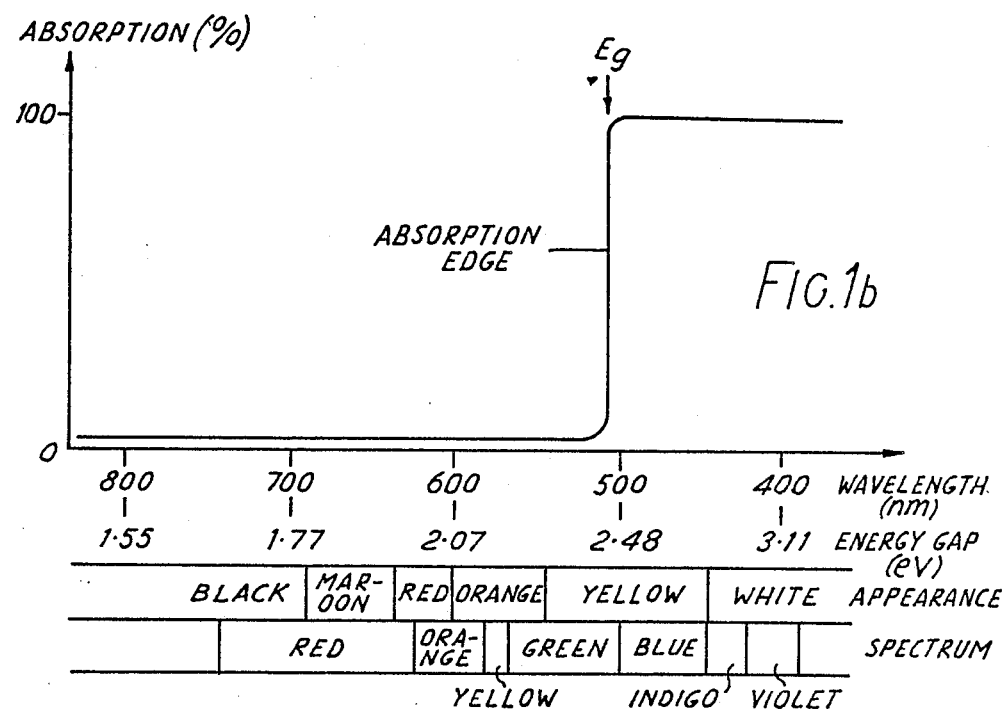

FIG. 1 shows the relationship between the energy gap of a coloured semiconductor and the wavelength and equivalent colour at which the absorption edge occurs. The colour spectrum of the material comprises those colours having longer wavelengths than the absorption edge. Thus, with increasing temperature, blue, green, yellow, orange and red are successively lost from the colour spectrum of the material, and the corresponding sequence for the appearance of the colour of the material is white, pale yellow, yellow, orange, maroon and black, as shown in Table 2.

TABLE 2

| Colour | Approximate absorption edge (nm) |
|---|---|
| White | Less than 420 |
| Pale Yellow | 420–460 |
| Yellow | 460–530 |
| Orange/Yellow | 530–560 |
| Orange | 560–590 |
| Red/Orange | 590–610 |
| Red | 610–630 |
| Maroon | 630–650 |
| Dark Maroon | 650–670 |
| Black | greater than 670 |

The wavelength of the apparent colour is given by ½ (670+absorption edge) nm when the absorption edge lies between 460 and 670 nm.

British Patent No. 1,205,652 gives details of glassy materials (glasses or glass ceramics) having low co-efficients of linear thermal expansion. These materials are suitable for forming layers on a glassy surface. A typical composition is shown in Table 3.

TABLE 3

A low expansion devitrified glass composition (from Pat. No. 1,205,652 p.14, composition 15)

| 49.4% by weight | $SiO_2$ |
|---|---|
| 6.0% | $B_2O_3$ |
| 2.4% | $P_2O_5$ |
| 22.8% | MgO |
| 19.3% | $Al_2O_3$ |
| 0.1% | $CeO_2$ |

A glass of the above composition is heated for 1 hour at 800° C. and then for 1 hour at 1200° C. producing a glass having a linear expansion coefficient of $1.3 \times 10^{-7}$ per °C.

A composition of a thermochromic layer using the glass composition of Table 3 is shown in Table 4.

TABLE 4

Example of thermochromic composition using glass composition of Table 3)

| 10% | Thermochromic constituent eg CdS |
|---|---|
| 44.46% | $SiO_2$ |
| 5.4% | $B_2O_3$ |
| 2.16% | $P_2O_5$ |
| 20.52% | MgO |
| 17.37% | $Al_2O_3$ |
| 0.09% | $CeO_2$ |

Thermochromic layers may be formed by mixing powders of the relevant materials in the required proportions and mixing sufficient organic screen printing medium into the powders to give the required ink viscosity. The material is then silk screen printed on to the substrate, dried at 150° C. and fired at 600°–900° C. In one example, 1.0 g CdS+9.0 g glass mixture (as in Table 4)+5 g screen printing medium were mixed, screen printed on to the substrate, dried at 150° C. and fired at 675° C.

In order to form a thermochromic layer on a substrate of relatively high expansion co-efficient, for example most metals, by weight of thermochromic powder may be mixed with 90% by weight of the mixed powders required to form a lead borate based glass of the required composition. An appropriate quantity of organic screen printing medium may then be added and the material silk screen printed onto the substrate. The coating is then dried at 150° C. and fired at 600°–900° C.

Table 5 lists some examples of materials having a colour stable with temperature. Such materials can be used for colour matching with the thermochromic material to indicate when the temperature of the surface, to which the materials have been applied, reaches the appropriate value, i.e. of a predetermined temperature.

TABLE 5

Non-thermochromic materials
No signifiant colour change from 0–500° C.

| Material | Colour |
|---|---|
| $ZrO_2$ | White |
| $SiO_2$ | White |
| MgO | White |
| $SnO_2$ | White |
| ($Pb_3$ $(SbO_4)_2$) (lead antimonate) | Yellow |
| Praseodymium doped $ZrO_2$ | Yellow |
| Nickel & Antimony doped $T_iO_2$ | Yellow |
| Chromium antimony doped $T_iO_2$ | Orange |
| Iron Oxide $Fe_2O_3$ | Red/Brown |

FIG. 2a shows a strip of thermochromic paint 2 across a hotplate 4 heated in four places (shown as black areas). FIG. 2b shows the appropriate colours for the strip 2 for the thermochromic material cadmium sulphide and indicates the pronounced colour changes in cadmium sulphide over the temperature range 20°–250° C. The thermochromic material ($Zn_{0.97}$ $Mn_{0.03}$) O gives similar colours across the strip to those given by cadmium sulphide.

The thermochromic material may be applied to one or more selected regions of a heatable surface such as a hotplate to increase its effect. If applied to the region that is the hottest when the hotplate is heated, this would maximise the colour change of the thermochromic material, indicating more clearly when the hotplate is hot and when it is cold. If applied to the region that cools the most slowly, e.g. the centre of the hotplate, this would ensure that the warning that the hotplate is still hot remains active for the longest period of time, once the heat has been turned off. Other convenient regions may also be selected.

As aforementioned, the thermochromic material may be used with a non-thermochromic material as background. This would emphasise the colour change of the thermochromic material and improve the contrast. The colour of the non-thermochromic material may be selected to indicate a predetermined temperature—the colour of the thermochromic material being this selected colour at the predetermined temperature. It is also envisaged that a combination of more than one thermochromic material, possibly together with one or more non-thermochromic materials, may be used, each material being applied to a different region to provide different contrasts in colour at different temperatures.

Thermochromic materials may be applied to a wide variety of heating units which operate at elevated temperatures, giving an indication that a surface is still hot, though the power has been switched off, or that a desired temperature has been reached. Some non-limiting examples include cooker hobs, irons, toasters etc.

An example of a heating unit provided in accordance with the invention is shown in FIGS. 3 and 4. A heating unit 10 comprises a heatable surface 12 (not shown in FIG. 3) e.g. a glass ceramic hob. An electrical heating element 14 is provided beneath the heatable surface 12 supported on an insulating substrate 16 comprising a first layer 18 of a thermally insulating material and a second layer 20 providing mechanical strength as well as thermal insulation. A thermal limiter 22 is provided across the heating unit in a raised groove 24 of the insulating substrate 16. The heating unit 10 is connected to an external power supply via a plug 26. The power supplied to the unit 10 and hence its temperature is regulated by a microswitch 28 controlled by the thermal limiter 22. A region 30 of the heatable surface 12 (position of region 30 indicated in dotted lines on FIG. 3) is coated with a layer 32 of thermochromic material such as CdS. After the surface 12 has been heated and the power switched off by the user, this region 30 in the centre of the heating unit cools the most slowly, so indicating that the surface 12 is hot until all of the surface 12 has cooled.

I claim:

1. A heating unit comprising a heatable surface having at least a region of the heatable surface coated or otherwise provided with a layer incorporating a thermochromic material in sufficient quantity to influence the perceived colour of the layer, the thermochromic material exhibiting an absorption edge wavelength which changes reversibly with temperature in the range of from 20° C. to at least 400° C., the absorption edge wavelength at 20° C. being in the range of from 540 nm to 610 nm, which wavelength progressively increases to a wavelength at 400° C. in the range of from 660 nm to 700 nm.

2. A heating unit according to claim 1 further comprising a layer of a non-thermochromic material surrounding the region provided with the layer incorporating the thermochromic material, the non-thermochromic material having a colour to match that of the thermochromic material at a predetermined temperature.

3. A heating unit according to claims 1 wherein the absorption edge wavelength of the thermochromic material at 400° C. is at least 90 nm greater than the absorption edge wavelength of said thermochromic material at 20° C.

4. A heating unit according to claim 1 wherein the thermochromic material comprises a compound consisting of cadmium, sulphur and selenium and having the formula $Cd(S_{1-x}Se_x)$.

5. A heating unit according to claim 4 where x is in the range of from 0 to 0.05.

6. A heating unit according to claim 1 wherein the thermochromic material comprises a compound consisting of zinc, manganese and oxygen and having the formula $(Zn_{1-y}Mn_y)O$.

7. A heating unit according to claim 6 where y is in the range of from 0.05 to 0.15.

8. A heating unit according to claim 1 wherein the layer incorporating the thermochromic material comprises a glass or glass ceramic material, said glass or glass ceramic material having a thermal expansion coefficient matching that of the heatable surface.

* * * * *